A. W. WALL.
SPRING FORK FOR CYCLES AND OTHER VEHICLES.
APPLICATION FILED AUG. 7, 1909.
984,787.
Patented Feb. 21, 1911.
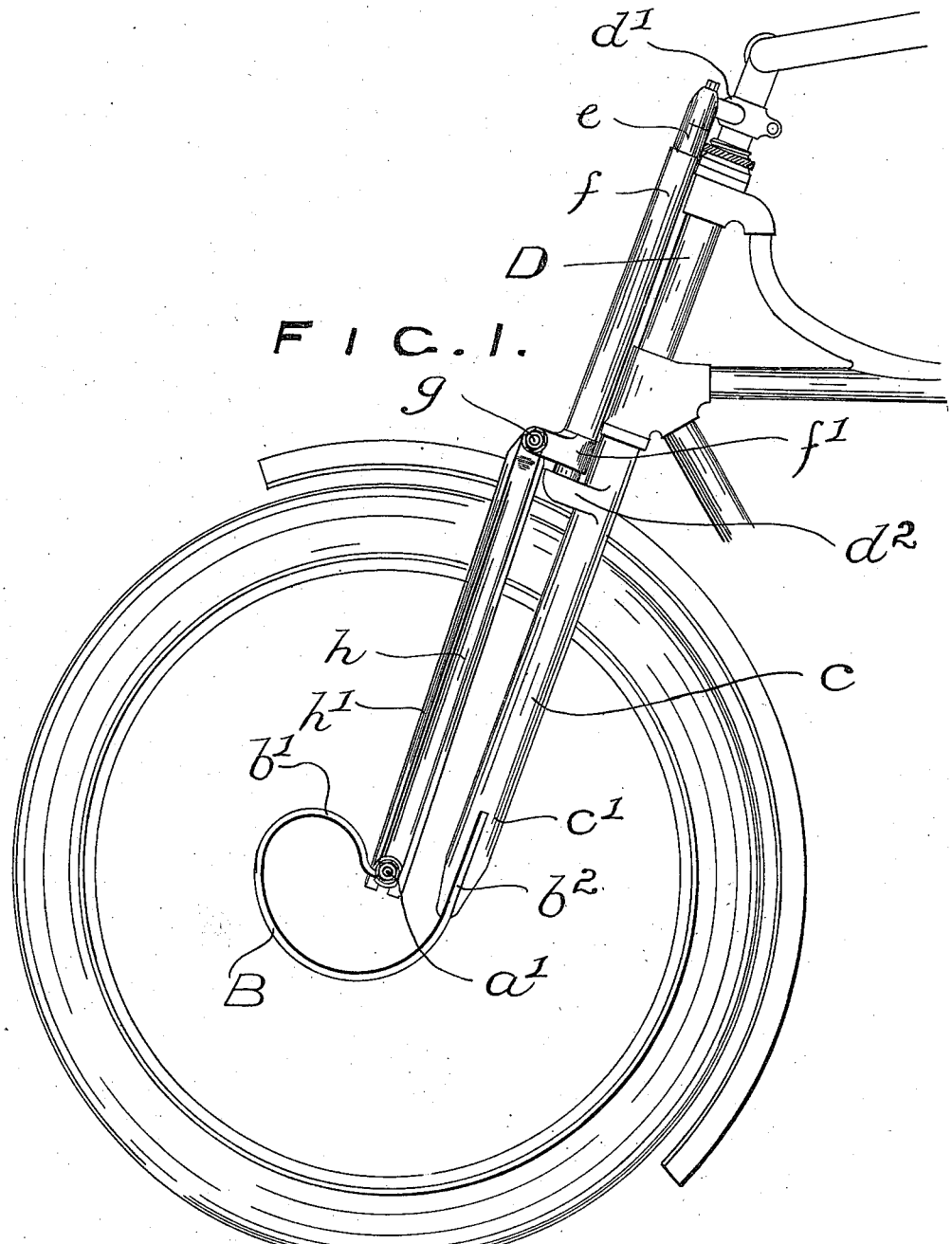

A. W. WALL.
SPRING FORK FOR CYCLES AND OTHER VEHICLES.
APPLICATION FILED AUG. 7, 1909.

984,787.

Patented Feb. 21, 1911.
2 SHEETS—SHEET 2.

Witnesses

Inventor
Arthur W. Wall
By C. H. Aikes
Atty.

UNITED STATES PATENT OFFICE.

ARTHUR W. WALL, OF BIRMINGHAM, ENGLAND.

SPRING-FORK FOR CYCLES AND OTHER VEHICLES.

984,787. Specification of Letters Patent. Patented Feb. 21, 1911.

Application filed August 7, 1909. Serial No. 511,738.

*To all whom it may concern:*

Be it known that I, ARTHUR WILLIAM WALL, a subject of the Kingdom of Great Britain, residing at Roc Motor Works, Aston Road, Birmingham, in the county of Warwick, England, have invented certain new and useful Improvements in or Relating to Spring-Forks for Cycles and other Vehicles, of which the following is a specification.

This invention relates to certain improvements in or relating to spring forks for cycles, motor cycles and the like and it has for its purpose to eliminate certain disadvantages which have manifested themselves with the usual type of spring fork, which yields in one direction only, the present invention being characteristic in that the wheel is capable of displacement in any direction in the plane of the wheel but in no other. This is effected by the provision of springs supplemented by a special arrangement of sliding and pivotal connections which latter permit of the universal movement of the springs.

In order that this invention may be clearly understood and more easily carried into practice reference may be had to the appended explanatory sheet of drawings, on which,—

Figure 3:
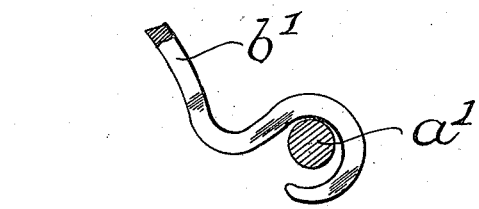
Figure 4:
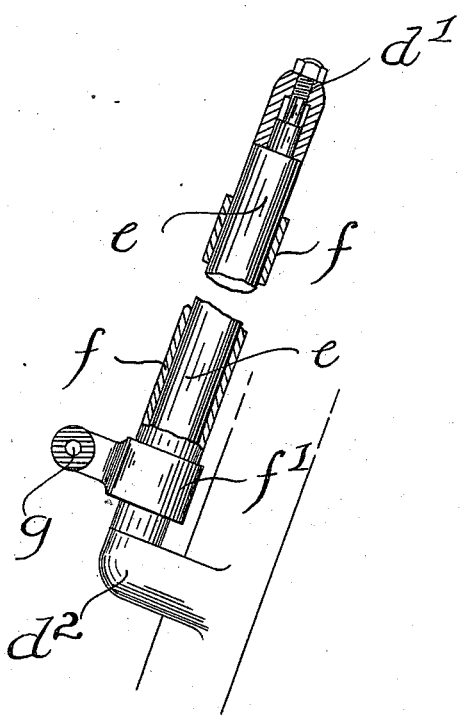
Figure 2:
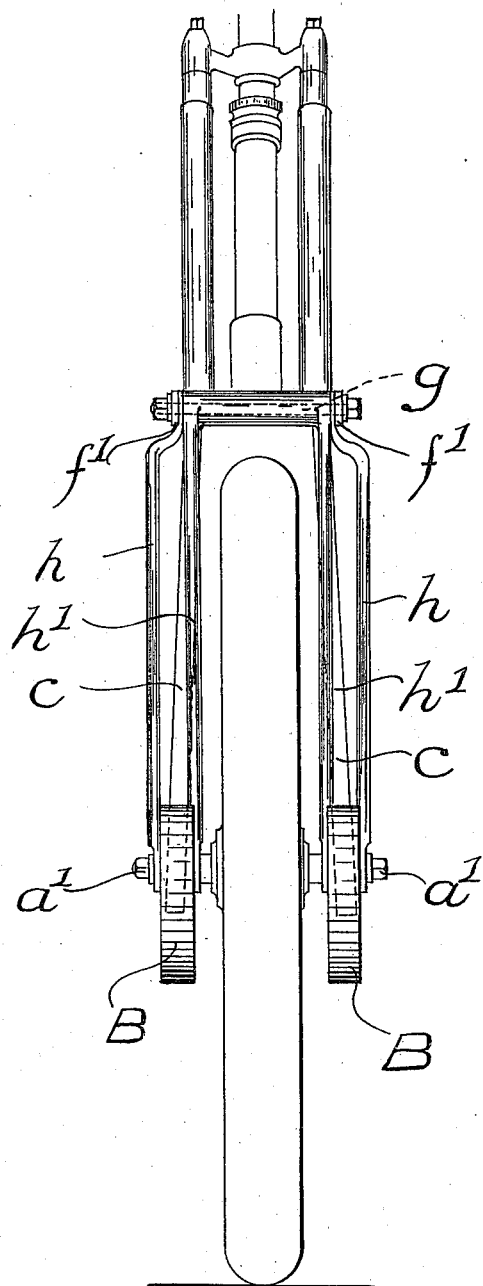

Figure 1 is a side elevation of a spring fork constructed according to the present improvements. Fig. 2 is a front elevation of the device shown by Fig. 1, with the mudguard removed. Fig. 3 is an enlarged view of the means adopted for attaching the wheel spindle to the spring. Fig. 4 is an enlarged view of the hereinafter described guide tube and member.

In an embodiment of this invention such as illustrated by the drawings, each extremity $a'$ of the wheel spindle is mounted at the inner end $b'$ of a flat scroll or curved spring B, the outer extremity $b^2$ of such springs B being let into the bottom portion $c'$ of the fork blades C or in cases where a double spring is used on each side, the outer extremities of such springs being advantageously continued as far as the fork crown for attachment to the front and rear respectively of the forks which latter may finish in the form of an inverted V.

In front of the steering head D and parallelly attached by suitable brackets $d'$ $d^2$ to turn therewith is located one or more rods or tubes $e$ to form a guide for a member $f$ adapted to slide thereon, such members $f$ being extended in a downward direction to provide appropriate abutments $f'$ for a transverse pivot $g$. This transverse pivot $g$ forms a fulcrum for duplex side links $h$ $h'$ which are continued to support the wheel spindle. Such side links $h'$ are rigidly connected at their upper extremities by means of a cross strut $h^2$, which construction renders the two links $h'$ incapable of independent relative movement and thereby prevents lateral movement of the wheel in the fork. The outer links $h$ are provided for the purpose of supplementing the links $h'$ in their carriage of the spindle $a'$ and to enhance the rigidity of the structure.

It will be readily understood that a rearward displacement of the front wheel will be mainly taken up by the movement of the aforesaid side links $h$ $h'$ around their upper fulcrum $g$, the remaining motion being absorbed by the sliding movement of the guide member $f$ whereas in the case of an upwardly directed motion practically all the movement is taken up by the guide member $f$. Any shock in an intermediate direction is equally well provided for by the concurrent operation of the movements. It will be obvious that shocks will be taken up in a more efficient manner than heretofore by reason of the shock absorbing medium being able to yield in any required direction, while at the same time the wheel is positively guided and able to follow such direction without undue strain on the wheel spindle.

When assembling the parts, the wheel and side links $h$ $h'$ are placed in position and the guide member $f$ placed over its tube $e$, the fulcrum $g$ being then attached and finally the guide tube $e$ bolted to the upper bracket $d'$ supporting same.

I do not restrict myself to the details set forth, as these may be modified without departing from the nature of the invention, while the invention may be applied to wheels other than the front one.

Having now described my invention I declare that what I claim is:—

1. In a motor cycle a steering head, a fork, curved springs attached at one end to the lower extremities of said fork, a wheel axle mounted in the other ends of the springs and supplementary means connected to the wheel axle and slidably connected to the steering head, whereby the wheel can yield in any direction.

2. In a motor cycle a steering head, a main fork, curved springs attached at one end to the lower extremities of said fork, a wheel axle mounted in the other ends of said curved springs, supplementary forks mounted on said axle, guides mounted in front of the crown tube, and members slidingly mounted on said guides and yieldingly carrying the upper extremities of said supplementary fork.

In witness whereof I have hereunto set my hand in the presence of two witnesses.

ARTHUR W. WALL.

Witnesses:
 ROWLAND L. GOOLD,
 WALTER H. E. BARTLAM.